US009064164B2

(12) United States Patent
Jett et al.

(10) Patent No.: US 9,064,164 B2
(45) Date of Patent: *Jun. 23, 2015

(54) METHODS AND SYSTEMS FOR AUTOMATIC DEVICE PROVISIONING IN AN RFID NETWORK USING IP MULTICAST

(71) Applicant: Cisco Technology, Inc., San Jose, CA (US)

(72) Inventors: Kenneth W. Jett, Alpharetta, GA (US); Reed Streifthau, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/042,231

(22) Filed: Sep. 30, 2013

(65) Prior Publication Data

US 2014/0111308 A1 Apr. 24, 2014

Related U.S. Application Data

(63) Continuation of application No. 11/346,739, filed on Feb. 3, 2006, now Pat. No. 8,698,603.

(51) Int. Cl.
*H04Q 3/00* (2006.01)
*G06K 7/10* (2006.01)
*H04L 12/18* (2006.01)

(52) U.S. Cl.
CPC .......... *G06K 7/10366* (2013.01); *H04L 12/189* (2013.01)

(58) Field of Classification Search
CPC ...................................................... H04Q 5/22
USPC .......... 340/10.4, 10.41, 10.51; 235/375, 385, 235/451; 370/352, 465, 310; 700/215
See application file for complete search history.

(56) References Cited

U.S. PATENT DOCUMENTS

| 4,625,081 A | 11/1986 | Lotito et al. |
| 4,688,026 A | 8/1987 | Scribner et al. |

(Continued)

FOREIGN PATENT DOCUMENTS

| EP | 1 355 448 | 10/2003 |
| EP | 1 376 456 | 1/2004 |

(Continued)

OTHER PUBLICATIONS

US Office Action dated Oct. 6, 2006, issued in U.S. Appl. No. 10/866,506.

(Continued)

*Primary Examiner* — Nam V Nguyen

(57) ABSTRACT

Methods and systems for automatic provisioning of RFID devices in an RFID network are described. A device, such as a Reader, has within its read field a special EPC Identity (ID) Tag that is specifically encoded for that Reader. When the Reader boots up, it reads the special ID Tag. The Tag indicates that the Tag is an EPC ID Tag and the data contained in the Tag will be used to provision the Reader. The Reader transmits an IP multicast packet containing data to a personality class appliance. Upon receiving the packet, the appliance retrieves configuration parameters for the Reader. These parameters collectively make up a personality class for the Reader. The personality data are transmitted back to the Reader. Once the Reader receives the configuration data, it provisions itself, becomes connected to the RFID network.

18 Claims, 9 Drawing Sheets

(56) References Cited

U.S. PATENT DOCUMENTS

| | | | |
|---|---|---|---|
| 5,339,073 A | 8/1994 | Dodd et al. | |
| 5,588,009 A | 12/1996 | Will | |
| 5,646,616 A | 7/1997 | Komatsu | |
| 5,850,187 A | 12/1998 | Carrender et al. | |
| 5,887,176 A | 3/1999 | Griffith et al. | |
| 6,070,187 A | 5/2000 | Subramaniam et al. | |
| 6,073,178 A | 6/2000 | Wong et al. | |
| 6,111,517 A | 8/2000 | Atick et al. | |
| 6,115,079 A | 9/2000 | McRae | |
| 6,212,563 B1 | 4/2001 | Beser | |
| 6,272,113 B1 | 8/2001 | McIntyre | |
| 6,282,186 B1 | 8/2001 | Wood, Jr. | |
| 6,286,763 B1* | 9/2001 | Reynolds et al. | 235/472.01 |
| 6,300,903 B1 | 10/2001 | Richards et al. | |
| 6,324,575 B1 | 11/2001 | Jain et al. | |
| 6,330,597 B2 | 12/2001 | Collin et al. | |
| 6,381,465 B1 | 4/2002 | Chern et al. | |
| 6,393,458 B1 | 5/2002 | Gigliotti et al. | |
| 6,473,858 B1 | 10/2002 | Shimomura et al. | |
| 6,539,281 B2 | 3/2003 | Wan et al. | |
| 6,553,489 B1 | 4/2003 | Osler et al. | |
| 6,677,852 B1 | 1/2004 | Landt et al. | |
| 6,802,659 B2* | 10/2004 | Cremon et al. | 400/76 |
| 6,832,249 B2 | 12/2004 | Ciscon et al. | |
| 6,836,778 B2 | 12/2004 | Manikutty et al. | |
| 6,843,121 B1 | 1/2005 | DeBar et al. | |
| 6,912,213 B2 | 6/2005 | Kim | |
| 6,963,282 B1 | 11/2005 | Yeates et al. | |
| 6,995,655 B2 | 2/2006 | Ertin et al. | |
| 7,064,660 B2 | 6/2006 | Perkins et al. | |
| 7,065,086 B2 | 6/2006 | Basso et al. | |
| 7,075,412 B1 | 7/2006 | Reynolds et al. | |
| 7,103,040 B2 | 9/2006 | Aalbers et al. | |
| 7,117,364 B1 | 10/2006 | Hepper et al. | |
| 7,150,017 B1 | 12/2006 | Vogl et al. | |
| 7,165,722 B2 | 1/2007 | Shafer et al. | |
| 7,177,915 B2 | 2/2007 | Kopchik | |
| 7,177,952 B1 | 2/2007 | Wurch et al. | |
| 7,221,660 B1 | 5/2007 | Simonson et al. | |
| 7,260,115 B1 | 8/2007 | DeFord | |
| 7,302,370 B2 | 11/2007 | Nickerson et al. | |
| 7,322,523 B2 | 1/2008 | Howarth et al. | |
| 7,325,734 B2 | 2/2008 | Howarth et al. | |
| 7,333,001 B2 | 2/2008 | Lane et al. | |
| 7,333,479 B2 | 2/2008 | Jalkanen et al. | |
| 7,336,175 B2 | 2/2008 | Howarth et al. | |
| 7,345,585 B2 | 3/2008 | Singhal et al. | |
| 7,394,381 B2 | 7/2008 | Hanson et al. | |
| 7,422,152 B2 | 9/2008 | Howarth et al. | |
| 7,568,015 B2 | 7/2009 | Wang et al. | |
| 7,590,739 B2 | 9/2009 | Swildens et al. | |
| 7,593,427 B1 | 9/2009 | Wongsonegoro et al. | |
| 7,648,070 B2 | 1/2010 | Droms et al. | |
| 7,658,319 B2 | 2/2010 | Howarth et al. | |
| 7,750,793 B2 | 7/2010 | Juels | |
| 7,789,308 B2 | 9/2010 | Droms et al. | |
| 7,953,826 B2 | 5/2011 | Howarth | |
| 8,060,623 B2 | 11/2011 | Vogel et al. | |
| 8,113,418 B2 | 2/2012 | Howarth et al. | |
| 8,249,953 B2 | 8/2012 | Howarth et al. | |
| 8,260,948 B2* | 9/2012 | Chand et al. | 709/231 |
| 8,698,603 B2* | 4/2014 | Jett et al. | 340/10.4 |
| 2001/0012292 A1 | 8/2001 | Merrill et al. | |
| 2001/0028308 A1 | 10/2001 | De La Huerga | |
| 2001/0056504 A1 | 12/2001 | Kuznetsov | |
| 2002/0001307 A1 | 1/2002 | Nguyen et al. | |
| 2002/0016739 A1 | 2/2002 | Ogasawara | |
| 2002/0046263 A1 | 4/2002 | Camerini et al. | |
| 2002/0075805 A1 | 6/2002 | Gupta et al. | |
| 2002/0136403 A1 | 9/2002 | Henson et al. | |
| 2002/0141393 A1 | 10/2002 | Eriksson et al. | |
| 2002/0161907 A1 | 10/2002 | Moon | |
| 2003/0014662 A1 | 1/2003 | Gupta et al. | |
| 2003/0014665 A1 | 1/2003 | Anderson et al. | |
| 2003/0046339 A1 | 3/2003 | Ip | |
| 2003/0065784 A1 | 4/2003 | Herrod | |
| 2003/0084279 A1 | 5/2003 | Campagna | |
| 2003/0095032 A1 | 5/2003 | Hoshino et al. | |
| 2003/0095520 A1* | 5/2003 | Aalbers et al. | 370/338 |
| 2003/0126248 A1 | 7/2003 | Chambers | |
| 2003/0174714 A1 | 9/2003 | Manik et al. | |
| 2003/0177374 A1 | 9/2003 | Yung et al. | |
| 2003/0226887 A1 | 12/2003 | Komine | |
| 2004/0010594 A1 | 1/2004 | Boyd et al. | |
| 2004/0021569 A1 | 2/2004 | Lepkofker et al. | |
| 2004/0061646 A1 | 4/2004 | Andrews et al. | |
| 2004/0064577 A1 | 4/2004 | Dahlin et al. | |
| 2004/0069852 A1 | 4/2004 | Seppinen et al. | |
| 2004/0073600 A1 | 4/2004 | Elo et al. | |
| 2004/0100383 A1 | 5/2004 | Chen et al. | |
| 2004/0108795 A1 | 6/2004 | Meek et al. | |
| 2004/0128389 A1 | 7/2004 | Kopchik | |
| 2004/0145474 A1 | 7/2004 | Schmidtberg et al. | |
| 2004/0257202 A1 | 12/2004 | Coughlin et al. | |
| 2004/0259557 A1 | 12/2004 | Bey | |
| 2005/0021626 A1 | 1/2005 | Prajapat et al. | |
| 2005/0027778 A1 | 2/2005 | Dimitrelis et al. | |
| 2005/0060208 A1 | 3/2005 | Gianantoni | |
| 2005/0080881 A1 | 4/2005 | Voorhees et al. | |
| 2005/0088284 A1 | 4/2005 | Zai et al. | |
| 2005/0093679 A1 | 5/2005 | Zai et al. | |
| 2005/0099270 A1 | 5/2005 | Diorio et al. | |
| 2005/0102406 A1 | 5/2005 | Moon | |
| 2005/0198228 A1 | 9/2005 | Bajwa et al. | |
| 2005/0199716 A1 | 9/2005 | Shafer et al. | |
| 2005/0209947 A1 | 9/2005 | Shafer et al. | |
| 2005/0228887 A1 | 10/2005 | Wang et al. | |
| 2005/0252957 A1 | 11/2005 | Howarth et al. | |
| 2005/0252970 A1 | 11/2005 | Howarth et al. | |
| 2005/0252971 A1 | 11/2005 | Howarth et al. | |
| 2005/0253717 A1 | 11/2005 | Howarth et al. | |
| 2005/0253718 A1 | 11/2005 | Droms et al. | |
| 2005/0253722 A1 | 11/2005 | Droms et al. | |
| 2005/0264420 A1 | 12/2005 | Vogel et al. | |
| 2006/0005035 A1 | 1/2006 | Coughlin | |
| 2006/0010086 A1 | 1/2006 | Klein | |
| 2006/0031374 A1 | 2/2006 | Lu et al. | |
| 2006/0033606 A1 | 2/2006 | Howarth et al. | |
| 2006/0044111 A1 | 3/2006 | Kollar et al. | |
| 2006/0047464 A1 | 3/2006 | Kumar et al. | |
| 2006/0053234 A1 | 3/2006 | Kumar et al. | |
| 2006/0072497 A1 | 4/2006 | Buehler et al. | |
| 2006/0077221 A1 | 4/2006 | Vaideeswaran et al. | |
| 2006/0089935 A1 | 4/2006 | Clifford et al. | |
| 2006/0091999 A1 | 5/2006 | Howarth | |
| 2006/0143318 A1 | 6/2006 | Prajapat et al. | |
| 2006/0253590 A1 | 11/2006 | Nagy et al. | |
| 2006/0259183 A1 | 11/2006 | Hayes et al. | |
| 2006/0262721 A1 | 11/2006 | Radunovic et al. | |
| 2006/0266832 A1 | 11/2006 | Howarth et al. | |
| 2007/0013518 A1 | 1/2007 | Howarth | |
| 2007/0080784 A1 | 4/2007 | Kim et al. | |
| 2007/0109100 A1 | 5/2007 | Jett et al. | |
| 2007/0112574 A1 | 5/2007 | Greene | |
| 2008/0087730 A1 | 4/2008 | Howarth et al. | |
| 2008/0104209 A1 | 5/2008 | Singhal et al. | |
| 2008/0197980 A1 | 8/2008 | Howarth et al. | |
| 2009/0049191 A1 | 2/2009 | Tolliver | |
| 2011/0004781 A1 | 1/2011 | Howarth | |
| 2012/0036243 A1 | 2/2012 | Vogel et al. | |

FOREIGN PATENT DOCUMENTS

| | | |
|---|---|---|
| EP | 05009063 | 4/2005 |
| GB | 2 365 662 | 2/2002 |
| WO | WO 98/26530 | 6/1998 |
| WO | WO 2004/012424 | 2/2004 |
| WO | WO 2005/114604 | 5/2005 |
| WO | WO 2005/060208 | 6/2005 |
| WO | WO 2005/114545 | 12/2005 |
| WO | WO 2005/114602 | 12/2005 |
| WO | WO 2005/114603 | 12/2005 |
| WO | WO 2007/011591 | 1/2007 |
| WO | WO 2008/016488 | 2/2008 |

(56) References Cited

FOREIGN PATENT DOCUMENTS

OTHER PUBLICATIONS

US Final Office Action dated Mar. 22, 2007, issued in U.S. Appl. No. 10/866,506.
US Notice of Allowance dated Sep. 10, 2007, issued in U.S. Appl. No. 10/866,506.
US Office Action dated Aug. 9, 2006, issued in U.S. Appl. No. 10/866,507.
US Office Action dated Jan. 18, 2007, issued in U.S. Appl. No. 10/866,507.
US Notice of Allowance dated Sep. 28, 2007, issued in U.S. Appl. No. 10/866,507.
US Office Action dated Oct. 6, 2006, issued in U.S. Appl. No. 10/866,285.
US Office Action dated Apr. 4, 2007, issued in U.S. Appl. No. 10/866,285.
US Notice of Allowance dated Sep. 10, 2007, issued in U.S. Appl. No. 10/866,285.
US Office Action dated Aug. 13, 2008, issued in U.S. Appl. No. 11/954,721.
US Notice of Allowance dated Feb. 11, 2009, issued in U.S. Appl. No. 11/954,721.
US Notice of Allowance dated Jun. 1, 2009, issued in U.S. Appl. No. 11/954,721.
US Notice of Allowance dated Sep. 22, 2009, issued in U.S. Appl. No. 11/954,721.
US Office Action dated Jul. 31, 2009, issued in U.S. Appl. No. 10/891,238.
US Final Office Action dated Feb. 4, 2010, issued in U.S. Appl. No. 10/891,238.
US Office Action dated Jun. 10, 2010, issued in U.S. Appl. No. 10/891,238.
US Final Office Action dated Nov. 17, 2010, issued in U.S. Appl. No. 10/891,238.
US Office Action dated Apr. 15, 2011, issued in U.S. Appl. No. 10/891,238.
US Final Office Action dated Sep. 29, 2011, issued in U.S. Appl. No. 10/891,238.
US Notice of Allowance dated Apr. 16, 2012, issued in U.S. Appl. No. 10/891,238.
US Office Action dated Mar. 31, 2009, issued in U.S. Appl. No. 11/304,944.
US Final Office Action dated Oct. 30, 2009, issued in U.S. Appl. No. 11/304,944.
US Office Action dated Apr. 14, 2010, issued in U.S. Appl. No. 11/304,944.
US Final Office Action dated Oct. 28, 2010, issued in U.S. Appl. No. 11/304,944.
US Office Action dated Feb. 7, 2011, issued in U.S. Appl. No. 11/304,944.
US Final Office Action dated Jul. 20, 2011, issued in U.S. Appl. No. 11/304,944.
US Office Action dated Feb. 15, 2013, issued in U.S. Appl. No. 11/304,944.
US Notice of Allowance dated Aug. 7, 2013, issued in U.S. Appl. No. 11/304,944.
US Office Action dated Jun. 18, 2007, issued in U.S. Appl. No. 11/010,089.
US Notice of Allowance dated Oct. 11, 2007, issued in U.S. Appl. No. 11/010,089.
US Notice of Allowance dated Jan. 11, 2008, issued in U.S. Appl. No. 11/010,089.
US Office Action dated Aug. 4, 2009, issued in U.S. Appl. No. 11/496,779.
US Final Office Action dated Jan. 26, 2010, issued in U.S. Appl. No. 11/496,779.
US Office Action dated Nov. 22, 2010, issued in U.S. Appl. No. 11/496,779.
US Office Action dated May 12, 2011, issued in U.S. Appl. No. 11/496,779.
US Notice fo Allowance dated Oct. 11, 2011, issued in U.S. Appl. No. 11/496,779.
US Office Action dated Oct. 26, 2010, issued in U.S. Appl. No. 12/082,635.
US Office Action dated Apr. 4, 2011, issued in U.S. Appl. No. 12/082,635.
US Office Action dated Sep. 29, 2011, issued in U.S. Appl. No. 12/082,635.
US Final Office Action dated Mar. 14, 2012, issued in U.S. Appl. No. 12/082,635.
US Office Action dated May 12, 2008, issued in U.S. Appl. No. 11/104,140.
US Final Office Action dated Oct. 6, 2008, issued in U.S. Appl. No. 11/104,140.
US Examiner Int Summ dated Jan. 14, 2009, issued in U.S. Appl. No. 11/104,140.
US Office Action dated Mar. 4, 2009, issued in U.S. Appl. No. 11/104,140.
US Final Office Action dated Sep. 30, 2009, issued in U.S. Appl. No. 11/104,140.
US Office Action dated Aug. 23, 2010, issued in U.S. Appl. No. 11/104,140.
US Notice of Allowance dated Jun. 27, 2011 issued in U.S. Appl. No. 11/104,140.
US Notice of Allowance dated Aug. 11, 2011 issued in U.S. Appl. No. 11/104,140.
US Office Action dated May 2, 2012 issued in U.S. Appl. No. 13/246,642.
US Final Office Action dated Oct. 11, 2012 issued in U.S. Appl. No. 13/246,642.
US Notice of Allowance dated Jul. 23, 2013 issued in U.S. Appl. No. 13/246,642.
US Office Action dated Aug. 6, 2008, issued in U.S. Appl. No. 11/119,169.
US Notice of Allowance dated Feb. 11, 2009, issued in U.S. Appl. No. 11/119,169.
US Notice of Allowance dated Jun. 4, 2009, issued in U.S. Appl. No. 11/119,169.
US Notice of Allowance dated Dec. 15, 2009, issued in U.S. Appl. No. 11/119,169.
US Notice of Allowance dated Apr. 19, 2010, issued in U.S. Appl. No. 11/119,169.
US Notice of Allowance dated Mar. 26, 2008, issued in U.S. Appl. No. 11/129,709.
US Notice of Allowance dated Aug. 8, 2008, issued in U.S. Appl. No. 11/129,709.
US Notice of Allowance dated Nov. 10, 2008, issued in U.S. Appl. No. 11/129,709.
US Notice of Allowance dated Apr. 13, 2009, issued in U.S. Appl. No. 11/129,709.
US Notice of Allowance dated Aug. 31, 2009, issued in U.S. Appl. No. 11/129,709.
US Office Action dated Nov. 26, 2008, issued in U.S. Appl. No. 11/182,312.
US Final Office Action dated Jun. 10, 2009, issued in U.S. Appl. No. 11/182,312.
US Office Notice of Allowance dated May 11, 2010, issued in U.S. Appl. No. 11/182,312.
US Office Notice of Allowance dated Sep. 1, 2010, issued in U.S. Appl. No. 11/182,312.
US Office Notice of Allowance dated Dec. 9, 2010, issued in U.S. Appl. No. 11/182,312.
U.S. Notice of Allowance dated Apr. 13, 2012 issued in U.S. Appl. No. 12/874,773.
U.S. Office Action dated Mar. 14, 2013 issued in U.S. Appl. No. 12/874,773.
US Office Action dated Oct. 2, 2009, issued in U.S. Appl. No. 11/346,739.
US Office Action Final dated Apr. 14, 2010, issued in U.S. Appl. No. 11/346,739.

(56) References Cited

OTHER PUBLICATIONS

US Office Action dated Feb. 25, 2013, issued in U.S. Appl. No. 11/346,739.
US Notice of Allowance dated Jul. 31, 2013, issued in U.S. Appl. No. 11/346,739.
Canadian Examination Report dated Feb. 4, 2008, issued in CA Appl. No. 2565099.
Canadian Examination Report dated Nov. 17, 2008, issued in CA Appl. No. 2,565,099.
Canadian Examination Report dated Oct. 14, 2010, issued in CA Appl. No. 2,565,099.
Canadian Examination Report dated Apr. 16, 2012, issued in CA Appl. No. 2,565,099.
Chinese First Office Action dated Feb. 29, 2008, issued in Appl. No. CN200580015167.4.
Chinese Second Office Action dated Aug. 15, 2008, issued in Appl. No. CN200580015167.4.
Chinese Third Office Action dated Feb. 20, 2009, issued in Appl. No. CN200580015167.4.
EP Supplementary European Search Report dated Aug. 9, 2010, in Appl. No. EP 05 750 091.0.
EP Office Action dated Oct. 8, 2010, issued in Appl. No. EP 05 750 091.0.
PCT International Search Report dated Feb. 17, 2006, issued in PCT/US2005/015322.
PCT Written Opinion dated Feb. 17, 2006, issued in PCT/US2005/015322.
PCT International Preliminary Report on Patentability and Written Opinion dated on Nov. 23, 2006, issued in PCT/US2005/015322.
Canadian Examination Report dated Feb. 1, 2008, issued in CA Appl. No. 2,565,456.
Chinese First Office Action dated Feruary 29, 2008, issued in Appl. No. CN200580015169.3.
Chinese Second Office Action dated Aug. 15, 2008, issued in Appl. No. CN200580015169.3.
EP Supplementary European Search Report dated Aug. 6, 2010, issued in Appl. No. EP05743006.8.
EP Office Action dated Oct. 18, 2010, issued in Appl. No. EP05743006.8.
PCT International Search Report dated on May 19, 2008, issued in PCT/US2007/16321.
PCT Written Opinion dated on May 19, 2008, issued in PCT/US2007/16321.
PCT International Preliminary Examination Report dated Feb. 3, 2009, issued in PCT/US2007/16321.
PCT International Search Report dated on Jul. 13, 2006, issued in PCT/US2005/016319.
PCT Written Opinion dated on Jul. 13, 2006, issued in PCT/US2005/016319.
PCT International Preliminary Examination Report dated on Nov. 23, 2006, issued in PCT/US2005/016319.
Chinese First Office Action dated Feb. 29, 2009, issued in Appl. No. CN200580015168.9.
Chinese Second Office Action dated Aug. 15, 2008, issued in Appl. No. CN200580015168.9.
EP Supplementary European Search Report dated Aug. 6, 2010, issued in Appl. No. EP05747434.8.
EP Office Action dated Oct. 26, 2010, issued in Appl. No. EP05747434.8.
PCT International Search Report dated on Sep. 12, 2007, issued in PCT/US2005/016958.
PCT Written Opinion dated on Sep. 12, 2007, issued in PCT/US2005/016958.
PCT International Preliminary Report on Patentability dated on Oct. 11, 2007, issued in PCT/US2005/016958.
Australian Examiner's First Report dated Apr. 17, 2009, issued in AU Appl. No. 2005246794.
Canadian Office Action dated Jul. 5, 2011, issued in CA Appl. No. 2,565,451.
Canadian Office Action dated Sep. 18, 2012, issued in CA Appl. No. 2,565,451.
Chinese Office Action dated Oct. 23, 2009, issued in Appl. No. CN200580015166.X.
EP Supplementary European Search Report dated Aug. 6, 2010, issued in Appl. No. EP05753531.2.
EP Office Action dated Oct. 8, 2010, issued in Appl. No. EP05753531.2.
PCT International Search Report and Written Opinion dated Mar. 6, 2008, issued in PCT/US2006/026970.
PCT International Preliminary Report on Patentability and Written Opinion dated Mar. 17, 2009, issued in PCT/US2006/026970.
Abbott, et al., "Alternatives for Providing Routing and Location Information to Support Emergency Calling issued in IP Enterprises", NENA Technical Information Document; Oct. 3, 2003, XP002323684, 16 pgs.
AeroScout Visibility System: Bridging the Gap Between Wi-Fi, Active RFID and Telemetry, AeroScout Enterprise Visibility Solutions, http://www.aeroscout.com/content.asp?p.=SystemOverview, printed Apr. 16, 2005, 3 pgs.
Alexander, et al., "DHCP Options and BOOTP Vendor Extensions," RFC 2132, *IETF Standard, Internet Engineering Task Force, IETF*, CH Mar. 1, 1997, 32 pp.
Bilorusets, Ruslan et al., "Web Services Reliable Messaging Protocol (WS-ReliableMessaging)", Mar. 2004, 40 pgs.
Cisco Application-Oriented Networking: A Network-Based Intelligent Message Routing System, http://www.cisco.com/en/US/products/ps6438/products_data_sheet0900aecd802c1f9c.html; Data Sheet, Cisco Systems, Inc., Jul. 13, 2005, 7 pgs.
Cisco Application-Oriented Networking—A Network Embedded Intelligent Message Routing System, http://www.cisco.com/en/US/products/ps6438/prod_bulletin0900aecd802c201b.html Product Bulletin No. 2886, Cisco Systems, Inc. Jul. 13, 2005, 3 pgs.
Cisco Catalyst 6500 Series Application-Oriented Networking Module, http://www.cisco.com/en/US/products/ps6438/products_data_sheet0900aecd802c1fe9.html Data Sheet, Cisco Systems, Inc. Jul. 13, 2005, 3 pgs.
Cisco Catalyst 6500 Series Application-Oriented Networking Module: Large Photo, Photo, downloaded issued in http://www.cisco.com/en/US/products/ps6448/prod_view_selector.html (Retrieved and printed Jul. 13, 2005), Cisco Systems, Inc., 1 pg.
Droms, (Mar. 1997) Bucknell University R: "Dynamic Host Configuration Protocol", *Request for Comments RFC 2131*, 41 pgs.
EPCg1, "Frequently Asked Questions," http://www.epcglobalinc.com/about/faqs.html, printed Mar. 24, 2005, 9 pp.
EPCglobal Architecture Framework, EPCglobal Final Version of Jul. 1, 2005, pp. 1-53 (submitted in 2 parts).
EPCglobal EPCTM Generation 1 Tag Data Standards Version 1.1 Rev. 1.27; http://www.epcglobalinc.org/standards/tds/tds_|_| rev_|_27-standard-2005051.pdf; 87 pgs (submitted in 3 parts).
EPC™ Tag Data Standards Version 1.1 Rev.1.24, EPCglobal, Standard Specification, Apr. 1, 2004, 78 pages.
Fujitsu Limited, etc., "Web Services Reliability (WS-Reliability) Ver1.0", Jan. 8, 2003, 45 pgs.
Harrington, et al., "An Architecture for DescribingSimple Network Management Protocol (SNMP) Management Frameworks," RFC 3411, Dec. 2002, 64 pp. 9 (submitted in 2 parts).
Johnson, "TFTP Server Address DHCP Option," draft-raj-dhc-tftp-addr-option-00.txt, Internet-Draft, Feb. 6, 2005, 7 pages.
Johnston, "DHCP Preboot Execution Environment (PxE) Options draft-ietf-dhc-pxe-options-01.txt," Internet-Draft, Jan. 21, 2005, 7 pages.
Littlefield, "Vendor-Identifying Vendor Options for Dynamic Host Configuration," Protocol version 4 (DPHCPv4), RFC 3925, Oct. 2004, 9 pages.
Lonvick, "The BSD Syslog Protocol," RFC 3164, Aug. 2001, 28 pages.
Mockapetris, "Domain Names—Concepts and Facilities", RFC 1034, Nov. 1987, 43 pages.
Mockapetris, "Domain Names—Implementation and Specification", RFC 1035, Nov. 1987, 55 pages.
Patrick Motorola BCS M: "DHCP Relay Agent Information Option," RFC 3046, Jan. 2001, 13 pp.

(56) References Cited

OTHER PUBLICATIONS

Polk, et al. (2004) Dynamic Host Configuration Protocol Option for Coordinate-based Location Configuration Information, Network Working Group, Request for Comments: 3825, Category: Standards Track, Cisco Systems, Jul. 2004, 15 pp.

Presuhn, Editor, Version 2 of the Protocol Operations for the Simple Network Management Protocol (SNMP), RFC 3416, Dec. 2002, 31 pp.

Radunovic, EP 05009063.8, Receiving Data in a Sensor Network, Apr. 2005, 40 pp.

RFC-2236 Internet Group Management Protocol, v.1, Nov. 1997, retrieved issued in the Internet on Oct. 22, 2007 and Aug. 5, 2010 at http://www.faqs.org/rfcs/rfc2236.html, 19 pp.

Schulzrinne, "Dynamic Host Configuration Protocol (DHCPv4 and DHCPv6) Option for Civic Addresses Configuration Information," draft-ietf-geopriv-dhcp-civil-05, Internet-Draft, Feb. 19, 2004.

Simple Network Management Protocol, Internetworking Technologies Handbook, Chapter-56, printed Jul. 14, 2005, 12 pages.

Sommer, (2003) "Bro: An Open Source Network Intrusion Detection System," *Computer Science Department*, TU Munchen, Germany, 16 pages.

Stump, et al., "The User Class Option for DHCP," http://www.ietforg/rfc/, IBM, printed Mar. 24, 2005, RFC 3004, Nov. 2000, 6 pages.

T'Joens, Y. "DHCP Reconfigure Extension," http://www.ietf.org/rfc/, Alcatel, Dec. 2001, printed Mar. 24, 2005 (RFC 3203) 6 pages.

The Global Language of Business, downloaded issued in http://www.ean-int.org/locations.html (retrieved and printed Mar. 24, 2005) 5 pages.

WhereNet, Products, downloaded issued in http://wherenet.com/products_main.html, retrieved and printed Apr. 16, 2005, 2 pages.

Zimmermann (1980) "OSI Reference Model—The ISO Model of Architecture for Open Systems Interconnection", IEEE Transactions on Communications, 28(4):8pp.

\* cited by examiner

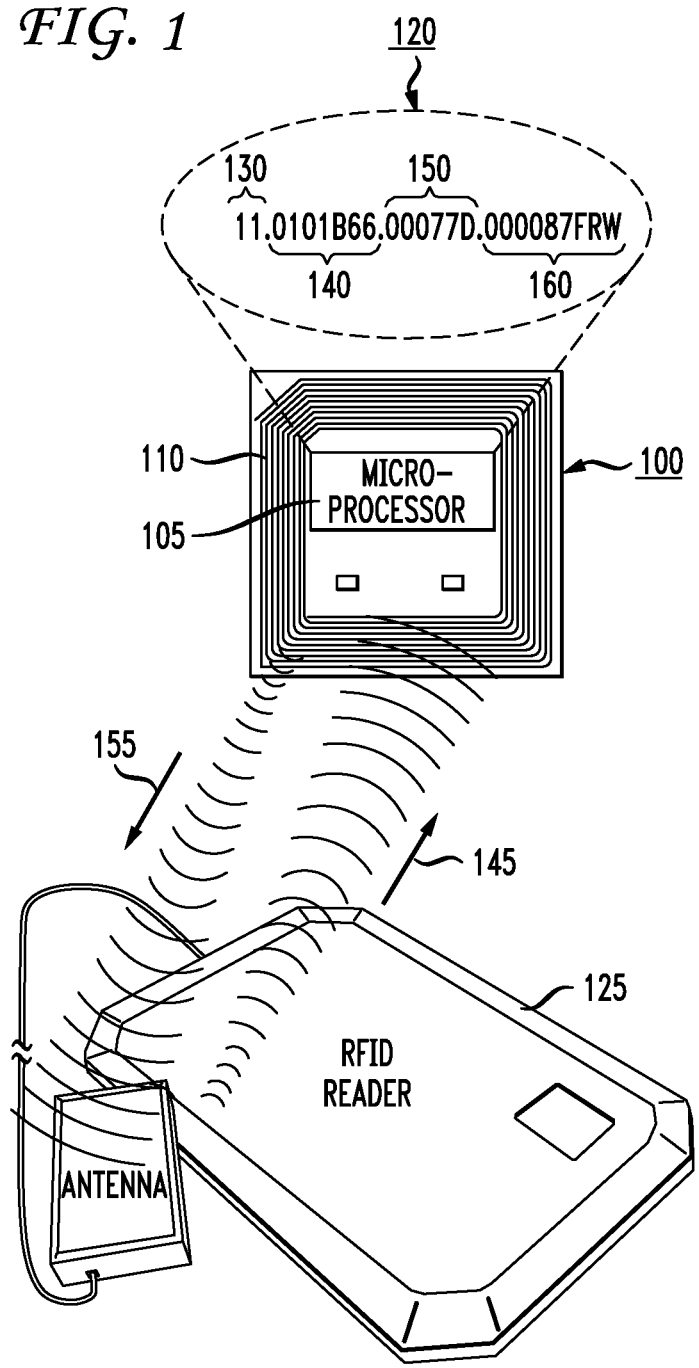

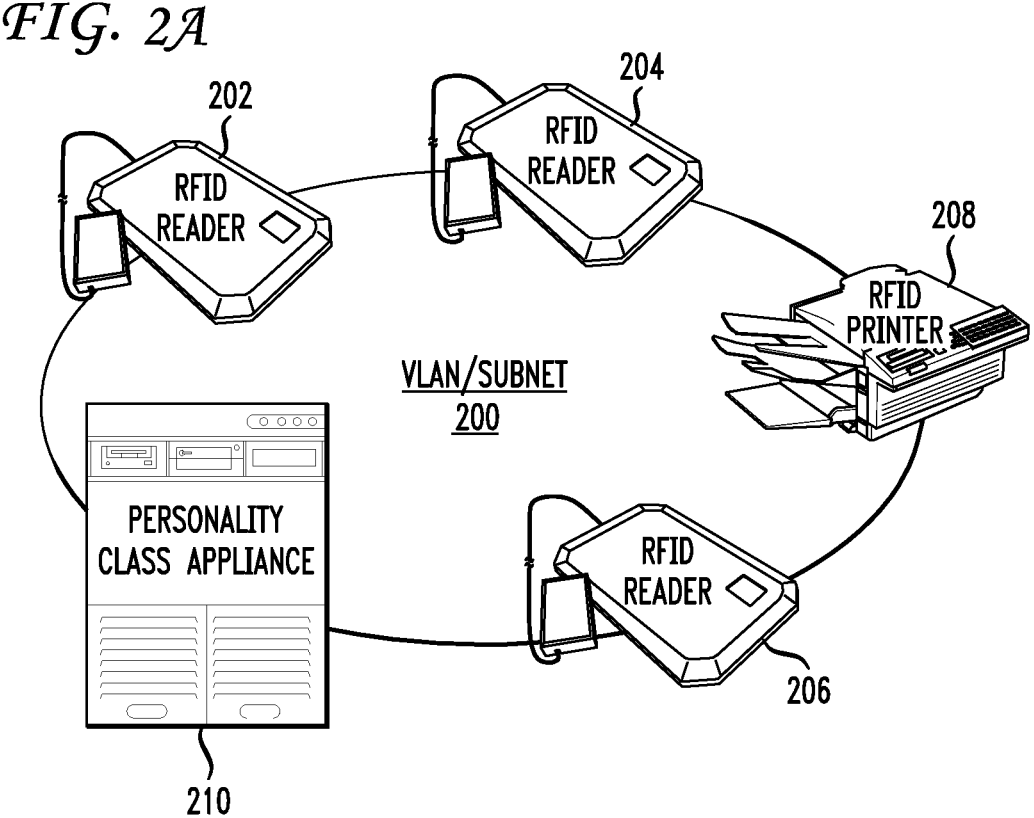

METHODS AND SYSTEMS FOR AUTOMATIC DEVICE PROVISIONING IN AN RFID NETWORK USING IP MULTICAST

RELATED APPLICATIONS

This application is a continuation of U.S. Pat. No. 8,698,603, entitled "Methods and Systems for Automatic Device Provisioning in an RFID Network Using IP Multicast," filed on Feb. 3, 2006, by Jett et al, which incorporated herein by reference in its entirety and for all purposes.

This application is related to U.S. patent application Ser. No. 8/866,506, entitled "Methods and Devices for Uniquely Provisioning RFID Devices" and filed on Jun. 9, 2004, to U.S. patent application Ser. No. 8/866,507, entitled "Methods and Devices for Locating and Uniquely Provisioning RFID Devices" and filed on Jun. 9, 2004, to U.S. patent application Ser. No. 8/866,285, entitled "Methods and Devices for Assigning RFID Device Personality" and filed on Jun. 9, 2004, to U.S. patent application Ser. No. 8/891,238, entitled "Methods and Devices for Determining the Status of a Device" and filed on Jul. 13, 2004, to U.S. patent application Ser. No. 8/876,48, entitled "System and Method for Automatically Configuring Switch Ports with Appropriate Features" and filed Jul. 21, 2004, to U.S. patent application Ser. No. 11/08,089, entitled "Methods and Devices for Providing Scalable RFID Networks" and filed on Dec. 9, 2004, to U.S. patent application Ser. No. 11/84,140, filed on Apr. 11, 2005, entitled "Automated Configuration of Network Device Ports," to U.S. patent application Ser. No. 11/119,169, filed on Apr. 29, 2005, entitled "Locating and Provisioning Devices in a Network" and to U.S. patent application Ser. No. 11/129,709, filed on May 12, 2005, entitled "Locating, Provisioning and Identifying Devices in a Network" (collectively, the "Cross-Referenced Applications"), and to the U.S. patent application Ser. No. 11/182,312, filed on Jul. 14, 2005, entitled "Provisioning and Redundancy for RFID Middleware Servers," all of which are hereby incorporated by reference for all purposes.

BACKGROUND OF THE INVENTION

1. Field of the Invention

The present invention relates to provisioning and redundancy for devices in an RFID network. More specifically, it relates to provisioning of devices in an RFID network using IP multicasting protocols.

2. Description of the Related Art

Bar codes containing a Universal Product Code ("UPC") have become a nearly ubiquitous feature of modern life. The vast majority of products, as well as packages, containers and other elements in the stream of commerce now bear a bar code to allow for convenient tracking and inventory control.

However, bar codes have some drawbacks. Bar codes are "read only," in that they are merely a printed set of machine-readable parallel bars that cannot be updated. Bar codes cannot transmit information, but instead must be read by a scanner. Bar codes must be scanned within a relatively short distance and must be properly oriented for the bar code to be read.

RFID Tags, the underlying implementation for "smart labels," have been developed in an effort to address the shortcomings of bar codes and add greater functionality. RFID Tags have been used to keep track of items such as airline baggage, items of clothing in a retail environment, cows and highway tolls. As shown in FIG. 1, an RFID Tag 100 includes microprocessor 105 and antenna 110. In this example, RFID Tag 100 is powered by a magnetic field 145 generated by an RFID Reader 125. The Tag's antenna 110 picks up the magnetic signal 145. RFID Tag 100 modulates signal 145 according to information encoded in the Tag and transmits a modulated signal 155 to RFID Reader 125.

Most RFID Tags use one of the Electronic Product Code ("EPC" or "ePC") formats for encoding information. EPC codes may be formed in various lengths (common formats are 64, 96 and 128 bits) and have various types of defined fields, which allow for identification of, for example, individual products, as well as associated information. These formats are defined in various documents in the public domain. One such document is EPC Tag Data Standards Version 1.1 Rev 1.27 (EPCglobal® 2005), which defines the EPCglobal Tag types and is hereby incorporated by reference for all purposes.

Also shown in FIG. 1 is an exemplary RFID Tag format. Here, EPC format 120 includes header 130, EPC manager field 140, object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product, that is, not simply a make or model, but a specific "serial number" of a make and model.

Prior art systems and methods for networking RFID devices, although improving, are still rather primitive. RFID devices have only recently been deployed with network interfaces. Device provisioning for prior art RFID devices is not automatic, but instead requires a time-consuming process for configuring each individual device. Prior art RFID devices and systems are not suitable for large-scale deployment of networks of RFID devices.

Moreover, many RFID devices and related network devices are deployed in a hostile industrial environment (such as a warehouse or factory) by relatively unskilled "IT" personnel. If a device deployed in one location fails, for example, it may simply be removed and replaced by a new device or a device that was deployed in another location.

Conventional RFID devices, such as Readers, are manually provisioned. As the RFID device population increases, there is currently no automatic way of provisioning RFID devices to accommodate the growth. For example, with the largest retailers, a typical location may have 25 to 35 RFID devices with hundreds and possibly thousands of locations. It is expected that the number of networked devices in an RFID network will increase exponentially as costs for the devices drop and the practical utility of RFID technology is more widely recognized.

There is a need to be able to uniquely identify and provision RFID devices, especially Readers, based upon the device's role within the overall RFID network.

For example, in one scenario, a BOOT-P or DHCP server in an RFID network requires that a Reader's configuration parameters such as the Reader's MAC address, multiple protocol data, and other parameters making up the personality class or role of the Reader be manually configured. Presently, an employee is required to read the MAC address and other data from the Reader and enter it into the BOOT-P server or other central server.

In another scenario, when a Reader has to be replaced, a new MAC address for the replacement Reader needs to be updated on the server along with new network parameters, protocol data, etc. Although the user interface of the server may offer profiles that make this process easier, it remains a time-consuming manual process prone to error.

Therefore, it would be desirable to have an autonomous and completely non-manual process for provisioning RFID devices. The process should take advantage of progress being made in RFID industry standards and utilize well-established communication protocols, such as IP multicasting, thereby addressing maintenance and scalability issues as the number of RFID devices in a network grows.

SUMMARY OF THE INVENTION

The present invention provides for the automatic provisioning of RFID devices in an RFID network. Readers, as well as other network devices that require provisioning, can be automatically provisioned for the Reader's specific function in the network immediately upon powering the Reader without any manual intervention or configuration. In one aspect of the present invention a method of provisioning a radio frequency identification ("RFID") device is described. An RFID Reader reads an affixed RFID Tag within the Reader's read field. The Reader transmits a data packet via IP multicasting containing data from the affixed RFID Tag to an IP multicast-enabled network component. The Reader receives a data packet from the network component containing configuration parameters which correspond to a personality class and are used by the Reader to automatically provision the Reader upon powering up for a specific function.

In another aspect of the present invention an Electronic Product Code ("EPC") Tag is described. The Tag has a field which, when storing a particular encoding, identifies the Tag as a certain type of Tag. Another field of the Tag is used for classifying an RFID device associated with EPC Tag. The Tag is affixed within a read field of the associated RFID device, such as a Reader. In another embodiment, the Tag has another field for storing a unique identifier for the associated RFID device. In another embodiment, the field that identifies the type of Tag is used to store a binary encoding that is reserved for identifying the Tag as an EPC identity Tag.

In another aspect of the present invention an RFID device is described. The device, such as a Reader, has an associated EPC Tag containing a value indicating that the Tag is an EPC identity Tag. The device also stores a value indicating a personality class for the device and a destination IP multicast address of an external source.

In another aspect of the present invention a method of provisioning an RFID device is described. A data packet is received at a network component via IP multicasting from an RFID device, where the device, such as a Reader, has a specific function or role in the RFID network. At the network component, configuration parameters are retrieved based on data in the packet. The configuration parameters are transmitted to the RFID device. The configuration parameters enable the RFID device to automatically provision itself to perform for in it specific role.

In another aspect of the present invention an RFID network is described. The network includes at least one RFID device having a read field and at least one EPC Tag associated with the device and is within the read field of the device. The network also has a component that can access configuration parameters suitable for the RFID device. Connectivity between the RFID device and the network component is IP multicast enabled.

The methods of the present invention may be implemented, at least in part, by hardware and/or software. For example, some embodiments of the invention provide computer programs embodied in machine-readable media. The computer programs include instructions for controlling one or more devices to perform the methods described herein.

BRIEF DESCRIPTION OF THE DRAWINGS

FIG. 1 is a diagram illustrating an RFID Reader, an RFID Tag, and an EPC Tag format.

FIGS. 2A and 2B are block diagrams showing network connections between RFID devices and a personality class appliance in accordance with one embodiment of the present invention.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

Methods and systems for automatically provisioning devices in an RFID network to function in a specific role are described in the accompanying figures. The present invention utilizes a new type or class of Electronic Product Code ("EPC") Tags, more commonly known as radio frequency identification ("RFID") Tags, that are attached to or part of a device, such as an RFID Reader. The new type of Tag, referred to as an EPC Identity ("ID") Tag enables a device to be automatically provisioned to function in a specific role in the RFID network upon the device being booted or powered up. The device sends a data packet via IP multicast protocol (the device being a multicast sender) to a network component referred to as a personality class appliance or PCA (a multicast receiver). The PCA transmits configuration parameters back to the device via a unicast IP message. The parameters are used by the device to automatically provision itself. To illustrate a preferred embodiment of the present invention, an RFID Reader is used as an exemplary RFID network device. As used herein, "provisioning" a device can include, but is not limited to, providing network configuration, providing personality configuration, incorporating the device into a network database and enabling the device with software.

Figure 2B:
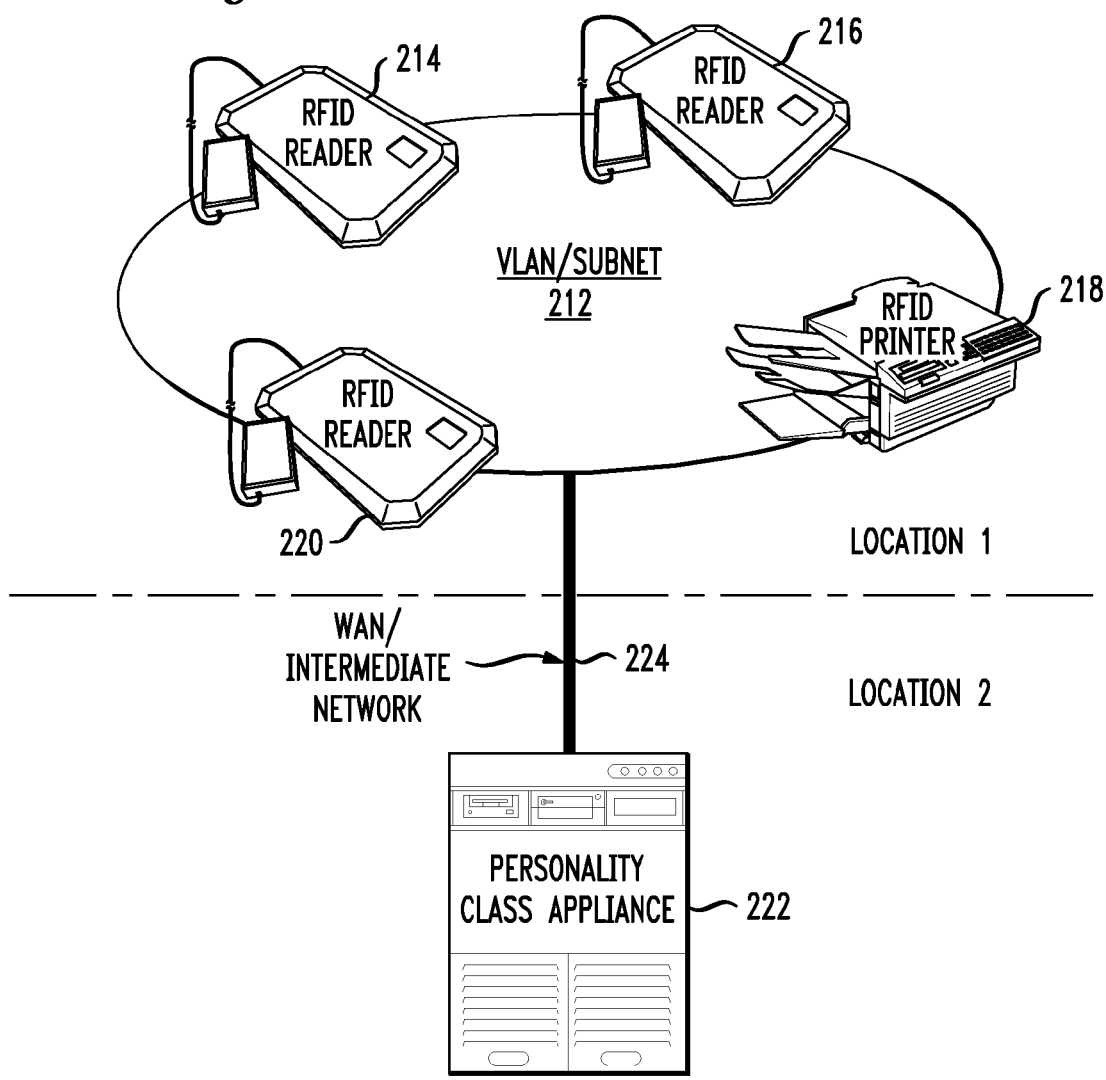

FIGS. 2A and 2B are block diagrams showing network connections between RFID devices and a PCA in accordance with one embodiment of the present invention. In FIG. 2A a virtual LAN ("VLAN") or subnet 200 connects RFID Readers 202, 204, and 206, and RFID printer 208 to a PCA 28 at a single location. For simplicity, numerous other RFID network devices and components not necessary in describing the present invention such as middleware, application, and DHCP servers, are not shown. PCA 28 can be on the same VLAN/subnet 200 as are devices 202, 204, 206, and 208 or on a separate VLAN/subnet at the same geographic location.

In FIG. 2B, the PCA and RFID devices are operating at two separate geographic locations. At Location 1 a VLAN/subnet 212 connects various RFID devices 214, 216, 218, and 220. A PCA 222 of the present invention operates at Location 2, a separate geographic location. PCA 222 can be on a VLAN/subnet (not shown) at Location 2 or can be a stand-alone component. In either case, a wide area network (WAN) or other intermediate network 224 connects PCA 222 (or a VLAN on which PCA 222 operates) to VLAN/subnet 200 at Location 1. WAN or other intermediate network 224 must be enabled for IP multicasting, reasons for which are described below.

Figure 3:
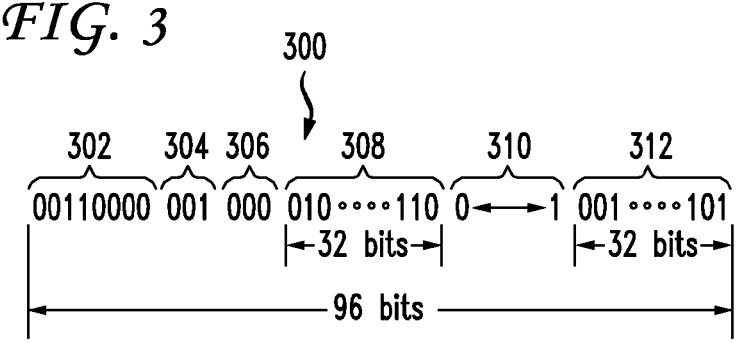
FIG. 3 is a diagram showing the format of an EPC Identity Tag in accordance with one embodiment of the present invention.

The present invention involves the use of an EPC Tag having a specific role: identifying and containing data about a particular RFID device. Conventional EPC Tags are attached to "things" that traverse a path. For example, in the retail environment, this path may be a supply chain and the thing may be a container of goods or a part in a manufacturing process, and so on. Generally, conventional EPC Tags are affixed to items that are not physical RFID network components, such as Readers, servers, and printers. In contrast the EPC ID Tag of the present invention is affixed or within the read field of a network device, such as a Reader or a printer. FIG. 3 is a diagram showing the basic structure of an EPC ID Tag of the present invention with random data encodings for illustrative purposes only. EPC ID Tag 300 shown in FIG. 3 is a 96-bit Tag. However, many of the concepts described herein can be used in Tags of varying bit length, including 128-bit Tags and 64-bit Tags even though shorter Tags offer less flexibility in terms of how certain fields (e.g., manager, object class) can be populated.

EPCglobal Generation 1 Tag Data Standards Version 1.1 Rev.1.27 defines the EPCglobal Tag types. More specifically, these standards define how data are encoded on the Tag. The first field is a header 302, a fixed 8-bit field. It is unaltered and not utilized in a preferred embodiment of the present invention. Following header 302 is a 3-bit filter value field 304. Of the eight possible binary encodings, four are presently used and four are reserved. The four reserved are 100, 101, 110, and 111. In a preferred embodiment, filter value field 304 uses one of the reserved encodings to identify a Tag as an EPC ID Tag. In a preferred embodiment, EPCglobal assigns a reserved value, such as 100, for this classification. In another preferred embodiment, an EPCglobal standard is not required given that the EPC ID Tag of the present invention is not intended to traverse the RFID network but rather remain affixed on or within a read field of an RFID device. Following filter value field 304 are a partition field 306 (3 bits) and an EPC manager field 308 (32 bits) which are not relevant to a preferred embodiment of the present invention. Following the EPC manager field 308 is a variable-length object class field 38 presently used to classify the Reader. The length of field 38 is determined by filter value field 304. In a preferred embodiment, the value in this field indicates which personality class should be used to provision the Reader. Object class field 306 is followed by a 32-bit serial number field 312 used to uniquely identify the device. As described below, the present invention uses the value in field 312 to make the processes in the PCA and in retrieving personality class configuration parameters possible.

Figure 4:
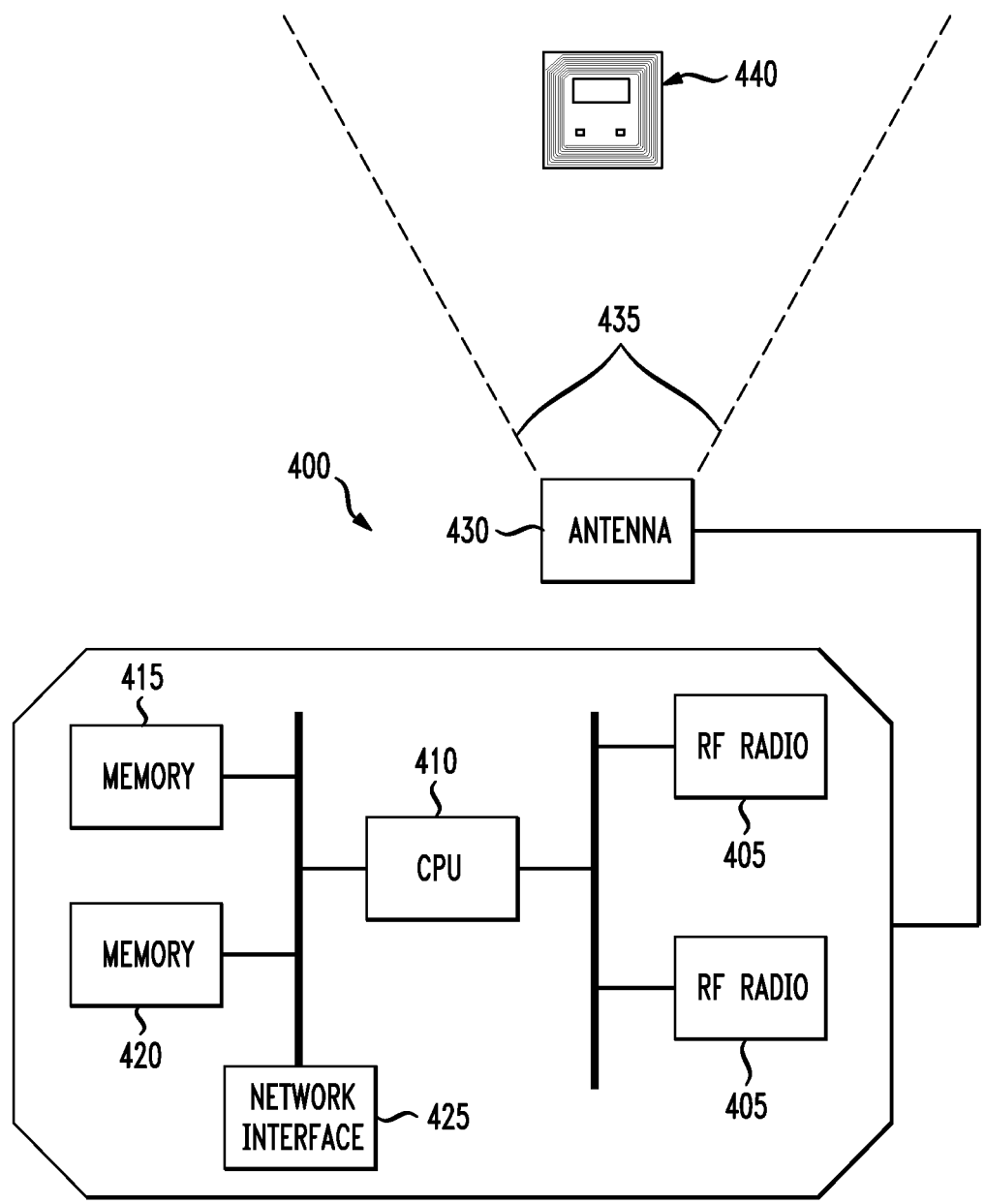
FIG. 4 is a diagram of a Reader with an EPC Identity Tag within the read field in accordance with one embodiment of the present invention.

As noted earlier, the EPC ID Tag of the present invention must be positioned within the read field or read point coverage of a Reader whether that be on the Reader, on the Reader antenna, or in proximity of the Reader. FIG. 4 is a diagram of a Reader with an EPC ID Tag within the read field in accordance with one embodiment of the present invention. RFID Reader 400 includes one or more RF radios 405 for transmitting RF waves to, and receiving modulated RF waves from EPC ID Tag 440 and other RFID Tags. RF radios 405 provide raw RF data that are converted by an analog-to-digital converter (not shown) and conveyed to other elements of RFID Reader 400. In some embodiments, these data are stored, at least temporarily, by CPU 48 in memory 415 before being transmitted to other parts of RFID network 200 via network interface 425. Network interface 425 may be any convenient type of interface, such as an Ethernet interface or IEEE 801.11 A/B/G wireless interface. Also shown is an antenna 430 for the Reader and an exemplary read field 435 of the antenna.

Flash memory 420 is used to store a program (a "bootloader") for booting/initializing RFID Reader 400. The bootloader, which is usually stored in a separate, partitioned area of flash memory 420, also allows RFID Reader 400 to recover from a power loss, etc. In some implementations, flash memory 420 is used to store personality information and other configuration information obtained from a PCA.

In a preferred embodiment, configuration information is downloaded from a PCA to memory 415. Updates may be instigated by the PCA or selected, trusted devices. New versions of the image file (e.g., the running, base image necessary to operate the RFID device) are copied into flash memory 420. Alternative embodiments of RFID devices implement methods of the present invention without flash memory 420.

More recent RFID devices also include dry contact input/output leads to connect to signal lights, industrial networks or the equivalent. These newer RFID devices typically have evolved in the amount of memory, flash, CPU capacity and methods of determining of the number, type and content of RFID Tags in their field of view. RFID Reader 400 of the present invention as shown in FIG. 4 has an EPC ID Tag 440 in its read field 435.

Each Reader in a group of Readers serving the same role in the RFID network share many of the same configuration parameters. Each Reader in the group is in the same personality class. For example, a retail RFID network may require multiple Personality Classes throughout the supply chain, including: receiving operations, shipping operations, low speed conveyors, high speed conveyors, depalletizers/palletizers, and stocking area. A defense or government RFID network would likely have different types of personality classes for its Readers.

The positioning of an EPC ID Tag for a Reader (or a group of Readers) depends on the type of Reader, its antenna configuration, Tag design, and other factors. Depending on the Reader antenna design, the Tag could be physically on the antenna or somewhere nearby. The ability of a Reader to read its associated EPC ID Tag when the Tag is directly attached to the Reader (component 400 of FIG. 4) will depend upon the read point coverage, antenna characteristics, reflection, and other factors. It may also be necessary to attenuate the EPC ID Tag to limit the practical range of the Tag so that it is not read by Readers in close proximity, as described in more detail. As is known in the field of RFID networks, an antenna can be in the same physical box as the Reader or can physically extend from the Reader. In another example, antenna types can be circular or linear. Some basic considerations such as antenna range or read field must be taken into consideration when deploying EPC ID Tags.

Figure 8:
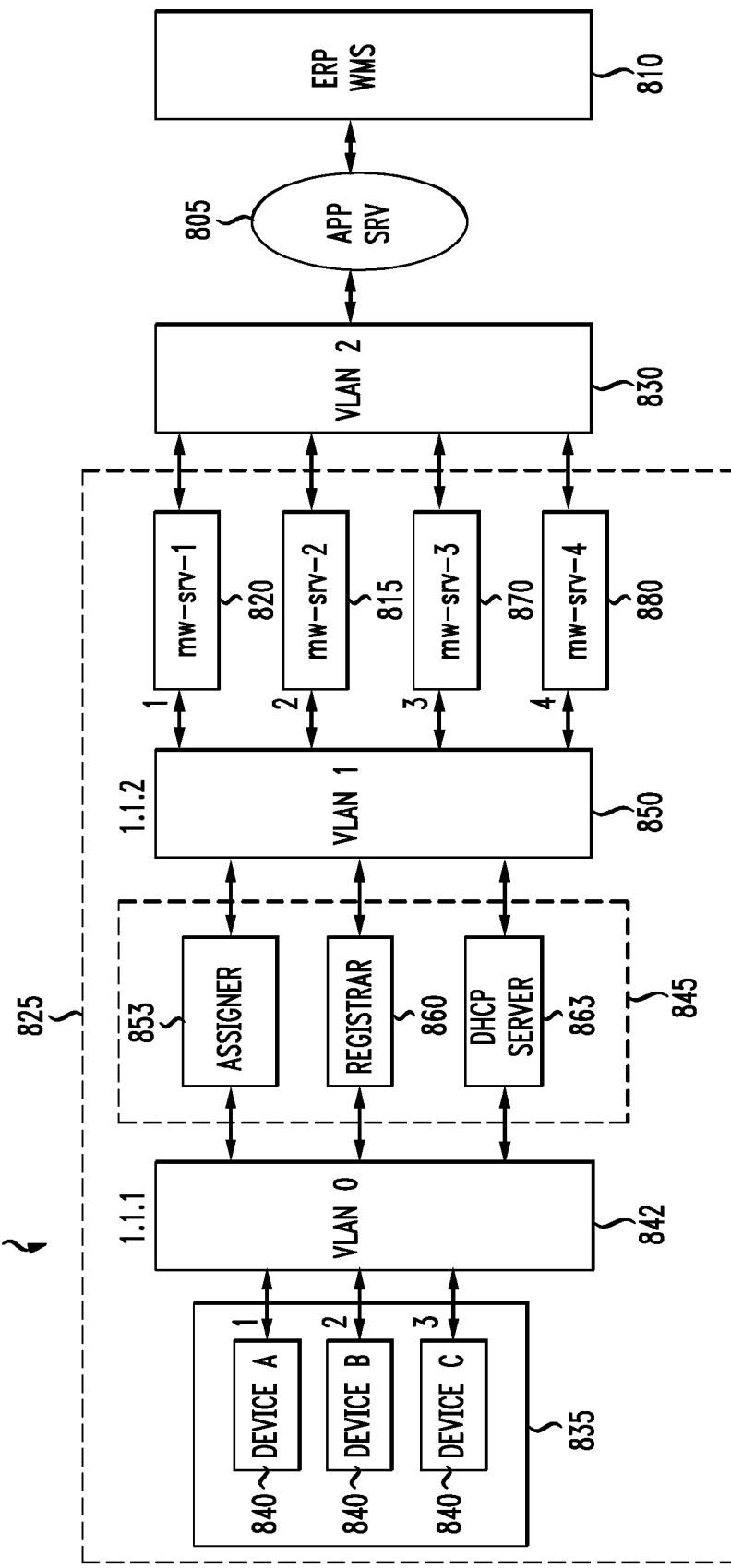
FIG. 8 is a block diagram of an RFID network showing middleware servers and related components useful in filtering duplicate messages between Readers and personality class appliances in accordance with one embodiment of the present invention.

It is possible that multiple Readers will have overlapping read point coverage. This is particularly true of dense mode Reader deployments. In such a scenario it may be possible that multiple Readers "see" and "report" the same EPC ID Tag or multiple Tags. One possible solution to this is to attenuate Tags by having Tags with antenna designs that would make the ID Tags more localized to the Reader to which the Tag is associated. Another solution would be to create a binding between a MAC/IP address and an EPC ID Tag and store the binding within the PCA. This could be done via a unicast IP request from the PCA to the Reader after the PCA has learned about the Reader. Another solution is to have middleware servers filter out or delete unintended duplicate reads of the same EPC ID Tag. An RFID network showing middleware servers and related components is shown in FIG. 8.

In a preferred embodiment, it is advantageous EPC ID Tag with enough attenuation to limit the read range of the Tag to the intended device. In another embodiment, Readers may have identical functions or roles and have the same exact personalities in which the EPC ID Tag antenna design does not need to be attenuated. However, if there is any difference in personalities of adjacent or tightly grouped Readers the design of the EPC ID Tag antenna is an important factor. With one type of EPC ID Tags, an antenna inlay with a small range is acceptable if the gain on the antenna is configured appropriately. In another embodiment, additional IP multicast sources, such as extra Readers are positioned so that their antennas can read the EPC ID Tags of one or more primary Readers and transmit the data packets to the PCA. The antennas of these extra Readers are dedicated to reading the EPC ID Tags.

In another preferred embodiment, Tags have RF characteristics that render the Tag transmission field relatively local so that the EPC ID Tag will not be inadvertently read by nearby or adjacent Readers for which the Tag is not intended. When a single EPC ID Tag is used to provision a group of Readers, the Tag can be placed in the read field of each Reader in the group. In this embodiment, each Reader in the group transmits the same EPC ID Tag data via IP multicast (discussed below) to one or more PCA, wherein each data packet has the same serial number inherent to the Tag taken from field 312 of FIG. 3. In addition to the automatic provisioning of the Reader, in another preferred embodiment described below, having an EPC ID Tag can be used to conduct regular or random status checks of a Reader or for testing antenna operation through interrogation of the desired multicast receivers, and eliminating excess data traffic on the RFID network.

The present invention utilizes IP multicasting for transmission between Readers and PCAs. IP multicasting is described in detail in RFC2365, incorporated herein in its entirety. In a preferred embodiment of the present invention, a Many to One ("Mt1") IP multicast implementation is used in which there are many sources (RFID Readers or other network devices) and one receiver (a PCA). Upon detecting an EPC ID Tag, a Reader sources (creates and transmits) an IP multicast packet to a predetermined IPv4/IPv6 Multicast Group Address. The packet uses a destination IP address in the multicast class D address space assigned via the Internet Assigned Numbers Authority (IANA) in the Internetwork Control Block (or the AD-HOC Block). Alternatively the destination IP address may be user assigned from the Administratively Scoped multicast address range as described in RFC2365. The IP Multicast packet, referred to in the present invention as a personality class load request ("PCLR"), contains the EPC ID Tag data, specifically, but not limited to, data in object class field 38 and serial number field 312. The PCLR is transmitted to the PCA using Reader network interface 425. In the present invention, the Reader is an IP multicast source. Thus, it does not require an Internet Message Group Protocol ("IGMP") stack. The PCA is an IP multicast receiver and does require an IGMP stack.

Figure 5:
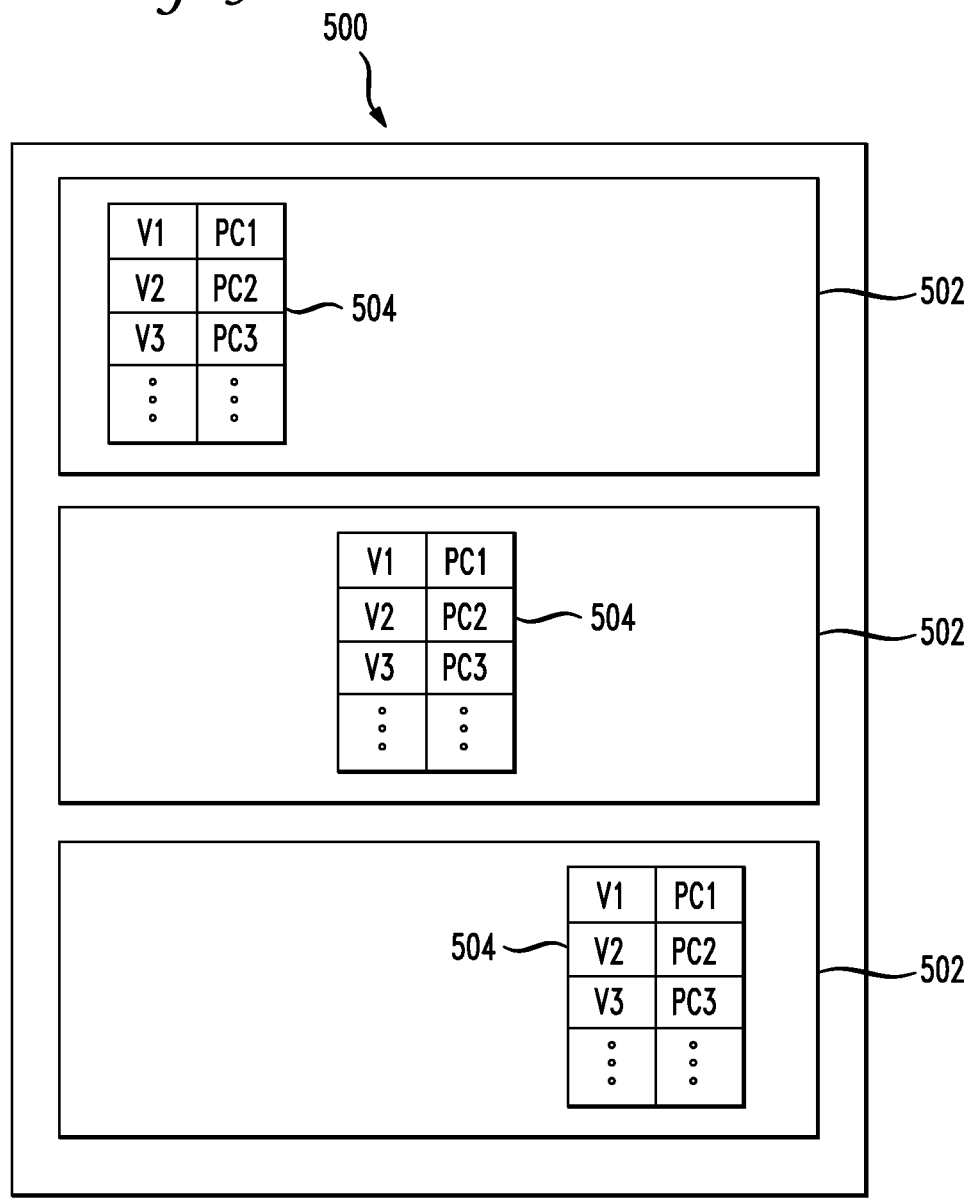
FIG. 5 is a block diagram showing components of a personality class appliance in accordance with one embodiment of the present invention.

As an IP multicast receiver, the PCA of the present invention is a member of the IP multicast group address that is programmed in the RFID Reader firmware (described below). As is known in the field of IP multicast programming, as an IP multicast receiver, the PCA must have an IGMP host stack. FIG. 5 is a block diagram showing components of a personality class appliance (PCA) in accordance with one embodiment of the present invention. PCA 500 has one or more databases 502 containing one or more tables 504. Tables 504 store mappings between values and personality classes. The values are those found in object class field 38. The personality classes are comprised of configuration parameters, which are stored in tables 504. For example, a value of "7" in object class field 38 maps to configuration parameter 1, parameter 2, and so on, which collectively make up a personality class. The values can be customized by an end user and personality classes can be added or deleted as necessary.

Upon receipt of a PCLR data packet from a Reader, PCA 500 deciphers the object class field value and then references tables 504 for a match. The personality class contains the configuration parameters necessary for the Reader to assume its unique role and specific function within the RFID network. If there is no match between the value in the PCLR and in tables 504, in a preferred embodiment a user-defined default personality class be assigned to the Reader. In another embodiment, the PCLR is discarded and an error message is returned.

When a Reader is damaged, lost, inoperable, or fails during operation, it is replaced with a different Reader. When the new Reader boots up, it repeats the process described above. The PCLR that is transmitted from the new Reader via IP multicast simply contains a different serial number. The EPC ID Tag from the previous Reader may or may not be used in conjunction with the replacement Reader. In the case where the same EPC ID Tag is reused to provision the replacement Reader, no changes are made to the PCA, unless the PCA has been configured to maintain state between device specific parameters (e.g., hostname, IP address, MAC address, etc.). In such a case the PCA will update its state tables to reflect any changes between the new and old Reader. In a scenario when the original EPC ID Tag cannot be reused for the replacement Reader, due to the condition, location, placement of the Tag, then the PCA will assign new personality parameters to the Reader and maintain state of the old Reader EPC ID Tag for a predefined, user configurable interval.

In another preferred embodiment, all potential personality class types are defined and made a standard in the RFID industry. This would ensure that all implementations of PCA 500 are uniform. In a preferred embodiment, PCA 500 is a server running the necessary applications to provide the functionality described herein, or a network application appliance such as an Application Oriented Network ("AON") Module from Cisco Systems, Inc. of San Jose, Calif., configured to perform the same tasks. The capabilities of PCA 500 will vary depending upon the level of functionality required by the RFID network implementation.

In another preferred embodiment, redundancy can be achieved by adding a second PCA. In this embodiment, a Reader can transmit its PCLR via multicast to a group of two or more PCAs and whichever PCA is enabled and listening can respond. In another embodiment, there is a master/slave relationship among PCAs using existing protocols such as HSRP, VRRP, or GLBP. In this embodiment, it is necessary to maintain PCA database state across multiple PCAs when deployed in a redundant manner.

Once a Reader receives the unicast data packet from the PCA, personality class configuration parameters are verified through an application layer acknowledgement. The Reader stops repeatedly sending PCLR packets to the PCA once the personality class configuration has been verified by the Reader. In the event of a failed personality class parameter load, the Reader would re-start sending PCLR packets to the PCA.

Figure 6:
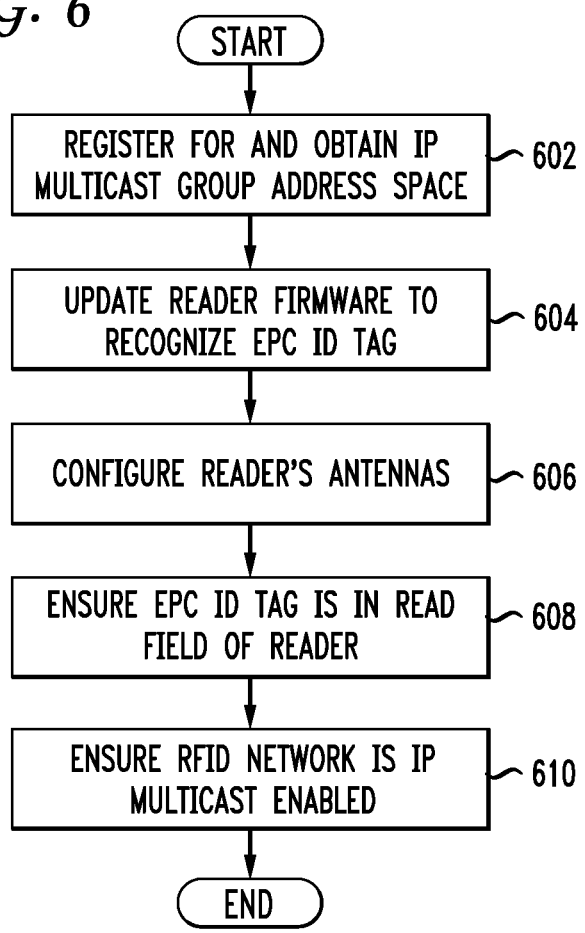
FIG. 6 is a flow diagram of a process of preparing for automatic provisioning of a Reader or other device in accordance with one embodiment of the present invention.

FIG. 6 is a flow diagram of a process of preparing for automatic provisioning of a Reader or other device in accordance with one embodiment of the present invention. At step 602, the entity operating the RFID network prepares the PCA by registering for an IP Multicast Group Address space with IANA. Once an IP multicast address space has been designated, at step 604 firmware in the Readers is updated. This includes inputting the IP multicast address. The Reader firmware is also updated so that when the Reader reads an EPC Tag and detects a value in filter value field 304, one of: 100, 101, 110, or 111, whether by EPC Global standard or by entity-imposed or entity-regulated mandate, the Reader knows that the Tag is an EPC Identity Tag. At step 606 the entity operating the RFID network configures the Readers' antennas. At step 608 the entity ensures that the EPC ID Tag is in the read field of the intended Reader and out of the read fields of nearby Readers or devices. At step 608 the RFID network is IP multicast enabled thereby ensuring that the PCA receives data packets regardless of the PCA's location. Part of this step is ensuring that the PCA is subscribed to a designated IP Multicast Group Address. This allows the PCA to receive PCLRs from the Readers.

Figure 7:
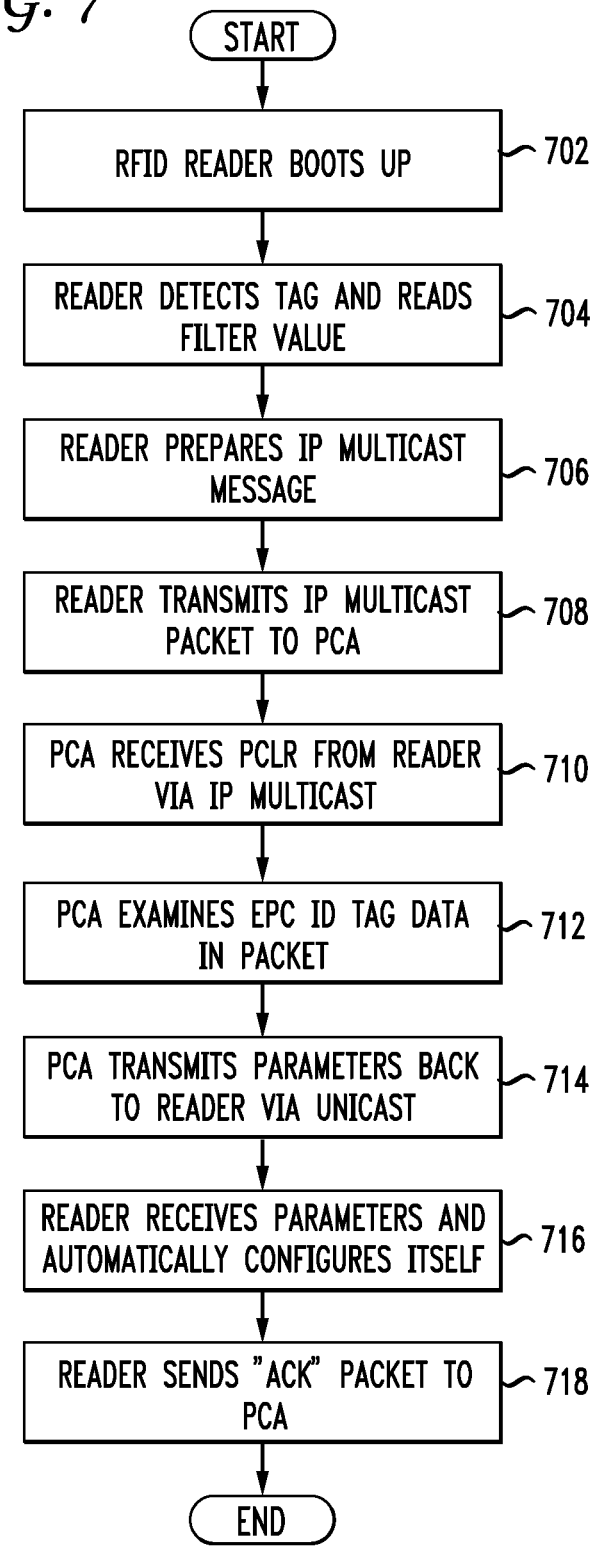
FIG. 7 is a flow diagram showing a process of automatic provisioning of an RFID device in accordance with one embodiment of the present invention.

FIG. 7 is a flow diagram showing a process of automatic provisioning of an RFID device in accordance with one embodiment of the present invention. The process described in FIG. 7 takes place after the steps described in FIG. 6 and a PCA has been installed as part of the RFID network and connectivity has been established.

At step 702 a Reader or other RFID device boots up and initializes its antenna source. The Reader comes up like any other device, such as a PC, printer, etc. and has network parameters such as IP address and default gateway obtained through DHCP. At step 704 the Reader detects a Tag in its read field and in the Tag sees a filter field value which has been pre-designated for identifying the Tag as an EPC Identity Tag of the present invention. At step 706 the Reader prepares to transmit an IP multicast message, a PCLR, to the PCA. The IP multicast address of the PCA is stored in the Reader firmware.

At step 708 the Reader sources the PCLR containing EPC ID Tag data and the Reader's IP address to the PCA. It is worth noting that the MAC address, host name, and other parameters of the Reader are not needed and are irrelevant in preparing the data packet and transmitting the PCLR. However, in some embodiments, these parameters are stored (their state is maintained) after a device has been provisioned.

At step 708 the PCA receives the data packet via IP multicast from the Reader. At step 712 the PCA examines the EPC ID Tag data in the packet. From the value in the object class field transmitted in the data packet, the PCA determines the personality class that it needs to retrieve from its databases and tables as shown in FIG. 5. For example, a value of "6" in the object class field may correspond to a "High Speed Conveyor" personality class and a corresponding set of parameters that will be used to configure the Reader. The PCA also reads the serial number contained in the data packet and may use it to retrieve configuration parameters it has cached. If the PCA has seen a serial number before, it can retrieve the personality configuration parameters from its databases or from a source accessible to the PCA.

At step 714 the PCA sends configuration parameters back to the Reader via a unicast IP message. The IP address of the Reader is sourced in the data packet the PCA received from the Reader. At step 716 the Reader receives the unicast data packet containing the configuration parameters which it uses to configure itself.

Once a Reader receives configuration parameters at step 716 via a unicast message from a PCA, the Reader sends an acknowledgement ("ACK") packet to the PCA at step 718 at which stage the process is complete. An ACK message prevents the PCA from repeatedly sending the personality class configuration parameters to the Reader. Transmission of an ACK message from the Reader is enabled by modifying the application layer of the Reader's firmware to require that an ACK message be sent once it receives configuration parameter. In another embodiment, the ACK message requirement can be hard-coded into the Reader firmware. A hard-coded parameter can be user configurable and be adjusted depending on several factors such as load attributes of the Reader, whether fast or slow convergence (the speed at which devices are activated) is desired. This can prevent overloading PCA(s) with traffic. This is particularly useful when the PCA sends personality data in multiple packets to a group of Readers, thereby allowing the PCA to confirm that each Reader associated with the group antenna source/Reader has received the personality class data. However the ACK message is implemented, this requirement or feature is one option for making the automatic provisioning methodology of the present invention a stateful system. In another embodiment, is a flag in the Reader firmware signifies that the Reader's personality has been loaded. At this stage the automatic provisioning process is complete.

Those of skill in the art will appreciate that the method steps discussed in FIGS. 6 and 7 need not be performed (and in some implementations are not performed) in the order shown and described. Moreover, some implementations of the methods discussed herein may include more or fewer steps than those shown in FIGS. 6 and 7.

As described above, Readers can be divided into several specific groups at a certain location where each group maps to a personality class. For example, in a retail environment, Readers at a dock door can be in one group. In this embodiment, the PCA sends signals to the group of Readers. A response from the group is unicast to the PCA. Possible uses of this configuration include, but are not limited to: management of the device; simultaneous modification of parameters of all devices in a group; shutdown of specific functions; status checks; forcing reloads; failover to another Reader in the group; and providing heartbeats.

After a group of Readers has been provisioned, if there is a change to the group, a system administrator can invoke a modification to the PCA to implement the change to the group of Readers (via CLI, remote access, etc.). The PCA multicasts the change or set of change commands to the Readers of the target group. This post-provisioning propagation eliminates the need to repeatedly make the change for each Reader in the group. EPC ID Tags can also be used to perform Reader health checks, for example, the ability to determine operational read points (antennas), validate Tag read operations, filter testing, etc. given that the EPC ID Tag is always intended to be within the read field of the Reader. This enables a sensory RFID network.

In another preferred embodiment, the Reader or other RFID device implements its own native IP multicast thereby making the Reader a multicast receiver. In this embodiment, the RFID Reader joins an IP Multicast Address group derived from its EPC ID Tag and has an IGMP host stack. Thus, the PCA is a multicast sender and the Reader is a multicast receiver. The personality class parameters transmitted from the PCA to the Reader are streamed to the Reader via PGM or another suitable error correcting method. The method uses the same EPC ID Tag procedure described above, except that the PCA derives a destination IP multicast group by converting a value in object class field 308 to the Reader's IP multicast group address. Object class field bits are mapped to multicast addresses. Bits in the object class field are still used to determine the Reader's personality class and the personality class' associated IP Multicast Group address. In an IPv4 implementation the first two octets of the 32-bit IP address are fixed and the remaining two octets can be obtained by using 16 bits from the object class field. There is more flexibility with the 96-bit EPC Tags since the Object Class field is a variable length field.

In another preferred embodiment of the present invention, the boot up of multiple Readers at the same time is pre-set with a rate limit. A rate limit is useful, for example, at a facility with a high number of Readers (e.g., 35) and other RFID devices that simultaneously power up. Without a rate limit in such scenarios, a PCA can be overloaded with multicast messages hitting it at the same time thereby potentially disabling the PCA from further operation or causing errors in personality class transmissions. One method of establishing a rate limit is to modify the firmware in the Readers and devices to enforce pacing by regulating time intervals between message, for example, by using a pseudo random value from the system clock. Another way to avoid overloading the PCA is to have one EPC ID Tag for a group of Readers as described above.

FIG. 8 illustrates another portion of a simplified RFID network 800 showing middleware servers and other components that can be used to filter our or delete duplicate reads of the same EPC ID Tag resulting from dense mode Reader deployments or where read point coverage may intersect. The details of network 800 are purely illustrative. Application server 805 operates according to instructions from application software 810 that resides in a memory device of, or accessible to, application server 805. Application server 805 is in communication with middleware servers 815 and 820 of site 825, via a virtual local area network ("VLAN2") 830 in this example. In this example, at least one of middleware servers 870 and 880 is a standby middleware server.

Site 825, for example a warehouse, includes numerous locations at which RFID devices are deployed. One such location is door 835, where a plurality of RFID devices 840 are positioned.

RFID devices 840 are in communication with metaserver 845 via "VLAN0" 842. In some preferred implementations metaserver 845 includes servers and associated devices that provide various functions, including those of DHCP server 863, assigner 853 and registrar 860. Accordingly, some of the functionality provided by the registrar and assigner as described in the Cross-Referenced Applications will be performed by metaserver 845. In some implementations, metaserver 845 is a single device and in other implementations metaserver 845 is an association of separate physical devices. Metaserver 845 may also include a load balancer.

Middleware servers 815, 820, 870 and 880 can communicate with metaserver 845 and registrar 860 via "VLAN1" 850.

Figure 9:
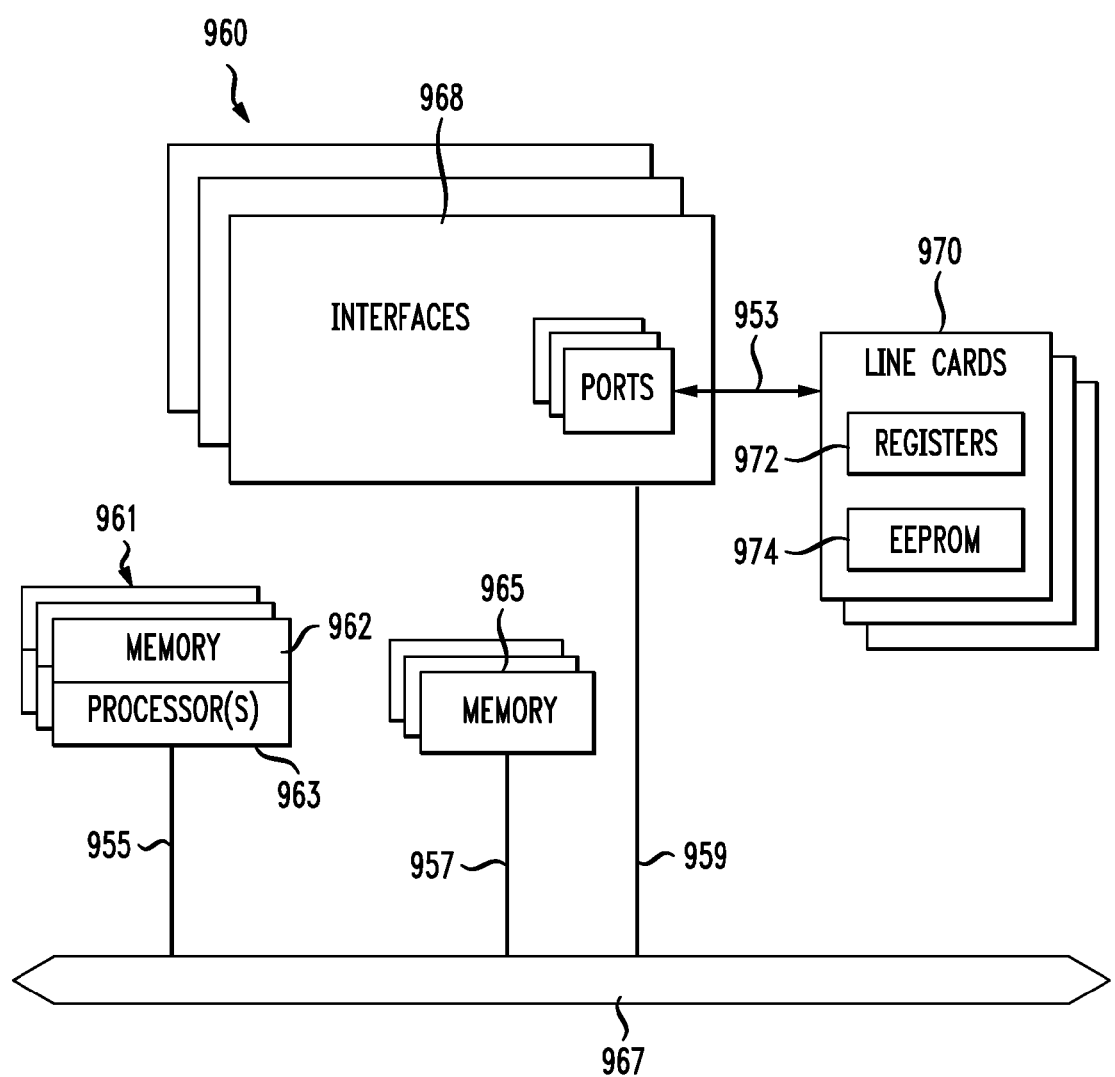
FIG. 9 is a block diagram of a network device that may be configured to implement some methods of the present invention.

FIG. 5 described above showed software and data components of a PCA of the present invention. FIG. 9 is a block diagram showing the internal hardware components of a PCA or equivalent network device that may be configured to implement some methods and portions of methods of the present invention. Network device 960 includes a master central processing unit (CPU) 962, interfaces 968, and a bus 967 (e.g., a PCI bus). Generally, interfaces 968 include ports 969 appropriate for communication with the appropriate media. In some embodiments, one or more of interfaces 968 includes at least one independent processor 974 and, in some instances, volatile RAM. Independent processors 974 may be, for example ASICs or any other appropriate processors. According to some such embodiments, these independent processors 974 perform at least some of the functions of the logic described herein. In some embodiments, one or more of interfaces 968 control such communications-intensive tasks as media control and management. By providing separate processors for the communications-intensive tasks, interfaces 968 allow the master microprocessor 962 efficiently to perform other functions such as routing computations, network diagnostics, security functions, etc.

The interfaces 968 are typically provided as interface cards (sometimes referred to as "line cards"). Generally, interfaces 968 control the sending and receiving of data packets over the network and sometimes support other peripherals used with the network device 960.

When acting under the control of appropriate software or firmware, in some implementations of the invention CPU 962 may be responsible for implementing specific functions associated with the functions of a desired network device, such as an RFID Reader. According to some embodiments, CPU 962 accomplishes all these functions under the control of software including an operating system (e.g. Linux, VxWorks, etc.), and any appropriate applications software.

CPU 962 may include one or more processors 963 such as a processor from the Motorola family of microprocessors or the MIPS family of microprocessors. In an alternative embodiment, processor 963 is specially designed hardware for controlling the operations of network device 960. In a specific embodiment, a memory 961 (such as non-volatile RAM and/or ROM) also forms part of CPU 962. However, there are many different ways in which memory could be coupled to the system. Memory block 961 may be used for a variety of purposes such as, for example, caching and/or storing data, programming instructions, etc.

Regardless of network device's configuration, it may employ one or more memories or memory modules (such as, for example, memory block 965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 9 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 9) or switch fabric based (such as a cross-bar).

Although the present invention involves methods and devices for automatically provisioning devices in an RFID network, many aspects of the present invention can be applied to identifying and provisioning devices, including wireless and wired devices, in other types of networks. For example, the present invention may also be used for automatically provisioning manufacturing devices, networked sensor devices, IP phones and hand-held devices, portable digital assistants and related network devices, such as servers and switches. Similarly, although much of the discussion herein applies to implementations using 64-Bit and 96-Bit EPC Tag structures and the IP multicasting protocol, the present invention is not necessarily protocol or format specific and may be used, for example, in implementations using IP broadcasting and 128-Bit EPC Tags. Likewise, while the implementations described herein refer to exemplary EPC Tag fields, other fields and specific bits within those fields may advantageously be used to implement the present invention.

The methods and devices of the present invention have broad utility, both in the public and private sectors. Any enterprise that needs to keep track of how its equipment or goods are being deployed, whether that equipment is used for commercial purposes, for military purposes, etc. can benefit from an RFID network. RFID devices that are networked according to the present invention can provide information allowing enterprises to track equipment and products (or groups of products). The information provided by RFID devices that are networked according to the present invention will be of great benefit for enterprise resource planning, including the planning of manufacturing, distribution, sales and marketing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. An apparatus, comprising:
a processor; and
a memory, at least one of the processor or the memory being configured to:
read an affixed RFID Tag associated with a radio frequency identification ("RFID") device;
transmit a first data packet via Internet Protocol (IP) multicasting containing data stored on the affixed RFID Tag, the first data packet indicating one of a plurality of personality classes of RFID devices, the one of the plurality of personality classes of RFID devices being a personality class in which the RFID device is classified; and
receive a second data packet containing configuration parameters that correspond to the one of a plurality of personality classes of RFID devices, wherein the configuration parameters enable automatic provisioning of the RFID device for a specific function performed by the RFID devices in the one of the plurality of personality classes.

2. The apparatus as recited in claim 1, at least one of the processor or the memory being further configured to:
automatically provision the RFID device for a specific function performed by the RFID devices in the one of the plurality of personality classes using the configuration parameters.

3. The apparatus as recited in claim 1 wherein the second data packet is received via unicast IP.

4. The apparatus as recited in claim 1 wherein the second data packet is received via IP multicasting.

5. The apparatus as recited in claim 1, at least one of the processor or the memory being further configured to transmit an acknowledgment message upon completion of provisioning.

6. The apparatus as recited in claim 1, at least one of the processor or the memory being further configured to identify the RFID tag as an Electronic Product Code ("EPC") identity tag.

7. The apparatus as recited in claim 1, at least one of the processor or the memory being further configured to create a first data packet from data stored on the affixed RFID tag such that the first data packet identifies the one of the plurality of personality classes of RFID devices.

8. An apparatus, comprising:
a processor; and
a memory, at least one of the processor or the memory being configured to:
receive a first data packet via Internet Protocol (IP) multicast from a radio frequency identification ("RFID") device having a specific role performed by one of a plurality of classes of RFID devices;
read a value in the first data packet, the value indicating the one of the plurality of classes of RFID devices to which the RFID device belongs;
retrieve configuration parameters for the one of a plurality of classes of RFID devices based on the value in the first data packet; and
transmit the configuration parameters to the RFID device, wherein the configuration parameters enable automatic provisioning of the RFID device to perform for the specific role of the one of the plurality of classes of RFID devices.

9. The apparatus as recited in claim 8, wherein the value is a personality class value.

10. The apparatus as recited in claim 8, wherein the configuration parameters are transmitted to the RFID device via unicast IP.

11. The apparatus as recited in claim 8, wherein the configuration parameters are transmitted to the RFID device via IP multicast.

12. An apparatus, comprising:
means for reading an affixed RFID Tag associated with a radio frequency identification ("RFID") device;
means for transmitting a first data packet via Internet Protocol (IP) multicasting containing data stored on the affixed RFID Tag, the first data packet indicating one of a plurality of personality classes of RFID devices, the one of the plurality of personality classes of RFID devices being a personality class in which the RFID device is classified; and means for receiving a second data packet containing configuration parameters that correspond to the one of a plurality of personality classes of RFID devices, wherein the configuration parameters enable automatic provisioning of the RFID device for a specific function performed by the RFID devices in the one of the plurality of personality classes.

13. The apparatus as recited in claim 12, further comprising:

means for automatically provisioning the RFID device for a specific function performed by the RFID devices in the one of the plurality of personality classes using the configuration parameters.

14. The apparatus as recited in claim 12, wherein the second data packet is received via unicast IP.

15. The apparatus as recited in claim 12 wherein the second data packet is received via IP multicasting.

16. The apparatus as recited in claim 12, further comprising:

means for transmitting an acknowledgment message upon completion of provisioning.

17. The apparatus as recited in claim 12, further comprising:

means for identifying the RFID tag as an Electronic Product Code ("EPC") identity tag.

18. The apparatus as recited in claim 12, further comprising:

means for creating a first data packet from data stored on the affixed RFID tag such that the first data packet identifies the one of the plurality of personality classes of RFID devices.

\* \* \* \* \*